(12) United States Patent
Shaw et al.

(10) Patent No.: US 9,956,866 B2
(45) Date of Patent: May 1, 2018

(54) ACTIVE GRILLE SHUTTER

(71) Applicant: Flex-N-Gate Advanced Product Development, LLC, Windsor, Ontario (CA)

(72) Inventors: David W. Shaw, Newmarket (CA); Joaquin Hung, Markham (CA); Wayne T. Doswell, Aurora (CA)

(73) Assignee: Flex-N-Gate Advanced Product Development, LLC, Windsor, Ontario (CA)

( * ) Notice: Subject to any disclaimer, the term of this patent is extended or adjusted under 35 U.S.C. 154(b) by 0 days. days.

(21) Appl. No.: 15/295,307

(22) Filed: Oct. 17, 2016

(65) Prior Publication Data

US 2017/0106741 A1   Apr. 20, 2017

Related U.S. Application Data

(60) Provisional application No. 62/242,560, filed on Oct. 16, 2015.

(51) Int. Cl.
*B60K 11/08* (2006.01)
*B60R 19/52* (2006.01)

(52) U.S. Cl.
CPC ............ *B60K 11/085* (2013.01); *B60R 19/52* (2013.01); *B60R 2019/525* (2013.01)

(58) Field of Classification Search
CPC ....... B60K 11/08; B60K 11/085; B60K 11/04; B60R 19/52; B60R 2019/525
USPC ...................................................... 296/193.1
See application file for complete search history.

(56) References Cited

U.S. PATENT DOCUMENTS

| | | | |
|---|---|---|---|
| 8,161,919 B2 | 4/2012 | Klotz et al. | |
| 8,708,078 B2 | 4/2014 | Charnesky et al. | |
| 2010/0243352 A1* | 9/2010 | Watanabe | B60K 11/085 180/68.1 |
| 2013/0223980 A1* | 8/2013 | Pastrick | B60K 11/085 415/1 |
| 2014/0273806 A1* | 9/2014 | Frayer, III | B60K 11/085 454/335 |
| 2014/0273807 A1* | 9/2014 | Frayer, III | B60K 11/085 454/335 |
| 2014/0295749 A1* | 10/2014 | Hijikata | B60K 11/085 454/256 |
| 2015/0020758 A1* | 1/2015 | Hosono | B60K 11/085 123/41.04 |
| 2016/0272060 A1* | 9/2016 | Edwards | B60K 11/085 |
| 2017/0072783 A1* | 3/2017 | Jeong | B60K 11/04 |
| 2017/0106741 A1* | 4/2017 | Shaw | B60K 11/085 |
| 2017/0297424 A1* | 10/2017 | Ibanez Moreira | F16H 37/12 |
| 2017/0326970 A1* | 11/2017 | Schoening | B60K 11/04 |

* cited by examiner

*Primary Examiner* — Gregory A Blankenship
(74) *Attorney, Agent, or Firm* — Reichel Stohry LLP; Mark C. Reichel; Natalie J. Dean (57) ABSTRACT

Active grille shutter. In an embodiment of a shutter system of the present disclosure, the shutter system comprises a plurality of moveable louvers, at least one lifter, the lifter including a lifter arm having a plurality of platforms and a plurality of spurs extending therefrom, a plurality of tensioners, and a drive mechanism connected to the lifter arm and structured to reversibly move the lifter arm and the plurality of platforms extending therefrom, wherein the movement of the lifter arm and platforms causes each louver to rotate about a pin extending therefrom, the pin adjacent and offset from the post.

20 Claims, 6 Drawing Sheets

ACTIVE GRILLE SHUTTER

PRIORITY

The present application is related to, and claims the priority benefit of, U.S. Provisional Patent Application Ser. No. 62/242,560, filed Oct. 16, 2015, the contents of which are hereby incorporated into the present disclosure in their entirety.

BACKGROUND

In recent years, automobile manufacturers are more commonly using active grille shutter systems to enable at least some control of the flow of air through the engine compartment. In a conventional, front-engine, water-cooled automobile, air is drawn through the front grille and into the engine compartment, either pulled in by the radiator fan or forced in by the movement of the vehicle in motion through the air. Generally, active grille shutter systems include moveable shutters that can open and close. When open, the shutters allow air to flow through the radiator and into the engine compartment to promote cooling of the engine. Under certain operating conditions when cooling is not needed, the shutters can be closed, thus diverting air around the vehicle to lessen aerodynamic drag and reduce fuel consumption. Moreover, closing the shutters reduces engine warm-up time by reducing the flow of relatively cold air through the radiator and around the engine of the vehicle. Decreased engine warm-up time may improve the emissions performance of certain engines and may further aid in warming the passenger compartment more quickly, including defrosting the windshield.

The front grille of many, if not most, vehicles is a prominent signature feature of a vehicle's design and includes stylized, complex surfaces having curvature and compound angles relative to the principal axes of the vehicle. However, conventional active grille shutter systems require that the grille surface be predominantly flat with shutters that rotated about a single, straight axis. Further, such grille shutter systems are generally not scalable to enable multiple sets of shutters rotating about different angles. Consequently, conventional active grille shutter systems are generally planar, having no curvature relative to the axes of the vehicle. Moreover, conventional active grille shutter systems are separate from the vehicle's stylized front grille and are positioned behind or rearward of that front grille, which may add cost, mass and space requirements to the vehicle. Therefore, there remains a significant need for the apparatuses, methods, and systems disclosed herein.

BRIEF SUMMARY

According to one aspect of the present disclosure, an active grille shutter system includes a plurality of louvers, which may be arranged as a first set of louvers and a second set of louvers, in contact with at least one lifter. In certain embodiments, the shutter system may include any desired number of sets of louvers and corresponding lifters. Each louver may include a post having a distal face that includes a developed shape. Each distal face may rest upon a corresponding platform extending from the adjacent lifter upon which the post may rock in a non-linear manner, thereby enabling complex rotation of the louver when the lifter is moved.

The present disclosure includes disclosure of a shutter system, comprising a plurality of moveable louvers each including a slat portion, a catch, and a post extending from the slat portion, each of the posts having a distal end defining a distal face; a lifter including a lifter arm having a plurality of platforms and a plurality of spurs extending therefrom, wherein the distal ends of the posts are positioned upon the plurality of platforms; a plurality of tensioners each connected to the catch of an adjacent louver of the plurality of movable louvers and further configured to apply tension between the adjacent louver and the spur of an adjacent lifter; and a drive mechanism connected to the lifter arm and structured to reversibly move the lifter arm and the plurality of platforms extending therefrom; wherein movement of the lifter arm and platforms causes the plurality of movable louvers to rotate about a pin extending from each of the plurality of movable louvers, each of the pins adjacent to and offset from each of the posts.

The present disclosure includes disclosure of a shutter system, further comprising at least one lifter guide configured to maintain alignment of the lifter arm.

The present disclosure includes disclosure of a shutter system, further comprising a drive input connected to the drive mechanism.

The present disclosure includes disclosure of a shutter system, further comprising a controller structured to operate upon an input to command the drive mechanism to move the lifter arm such the plurality of movable louvers rotate to a desired position.

The present disclosure includes disclosure of a shutter system, wherein in the distal face has a radius.

The present disclosure includes disclosure of a shutter system, wherein in the distal face has a developed shape.

The present disclosure includes disclosure of a shutter system, wherein the plurality of movable louvers comprises louvers on each side of the lifter.

The present disclosure includes disclosure of a shutter system, wherein each louver of the plurality of movable louvers has a generally airfoil shape in cross-section.

The present disclosure includes disclosure of a shutter system, wherein each louver of the plurality of movable louvers includes a horizontal portion and an angled portion.

The present disclosure includes disclosure of a shutter system, wherein the shutter system is integral with a grille of a vehicle.

The present disclosure includes disclosure of an overall system, comprising a shutter system comprising a plurality of moveable louvers each including a slat portion, a catch, and a post extending from the slat portion, each of the posts having a distal end defining a distal face, a lifter including a lifter arm having a plurality of platforms and a plurality of spurs extending therefrom, wherein the distal ends of the posts are positioned upon the plurality of platforms, a plurality of tensioners each connected to the catch of an adjacent louver of the plurality of movable louvers and further configured to apply tension between the adjacent louver and the spur of an adjacent lifter, and a drive mechanism connected to the lifter arm and structured to reversibly move the lifter arm and the plurality of platforms extending therefrom, wherein movement of the lifter arm and platforms causes the plurality of movable louvers to rotate about a pin extending from each of the plurality of movable louvers, each of the pins adjacent to and offset from each of the posts; and a vehicle grille, wherein the shutter system is coupled to the vehicle grille and operable to open and close the plurality of movable louvers when coupled to the vehicle grille.

The present disclosure includes disclosure of an overall system, wherein the vehicle grille has a plurality of apertures defined therethrough, and wherein the plurality of movable louvers are located at the plurality of apertures.

The present disclosure includes disclosure of an overall system, wherein the shutter system further comprises at least one lifter guide configured to maintain alignment of the lifter arm.

The present disclosure includes disclosure of an overall system, wherein the shutter system further comprises a drive input connected to the drive mechanism.

The present disclosure includes disclosure of an overall system, wherein the shutter system further comprises a controller structured to operate upon an input to command the drive mechanism to move the lifter arm such the plurality of movable louvers rotate to a desired position.

The present disclosure includes disclosure of an overall system, wherein the plurality of movable louvers comprises louvers on each side of the lifter.

The present disclosure includes disclosure of an overall system, wherein each louver of the plurality of movable louvers has a generally airfoil shape in cross-section.

The present disclosure includes disclosure of an overall system, wherein each louver of the plurality of movable louvers includes a horizontal portion and an angled portion.

The present disclosure includes disclosure of a shutter system, comprising a plurality of moveable louvers each including a slat portion, a catch, and a post extending from the slat portion, each of the posts having a distal end defining a distal face; a lifter including a lifter arm having a plurality of platforms and a plurality of spurs extending therefrom, wherein the distal ends of the posts are positioned upon the plurality of platforms; a plurality of tensioners each connected to the catch of an adjacent louver of the plurality of movable louvers and further configured to apply tension between the adjacent louver and the spur of an adjacent lifter; and a drive mechanism connected to the lifter arm and structured to reversibly move the lifter arm and the plurality of platforms extending therefrom; wherein movement of the lifter arm and platforms causes the plurality of movable louvers to rotate about a pin extending from each of the plurality of movable louvers, each of the pins adjacent to and offset from each of the posts; wherein the plurality of movable louvers comprises louvers on each side of the lifter; and wherein the shutter system is configured to be coupled to a vehicle grille such that the plurality of movable louvers are present at apertures defined within the vehicle grille and wherein the shutter system is operable to open and close the plurality of movable louvers when coupled to the vehicle grille.

The present disclosure includes disclosure of a shutter system, further comprising a controller structured to operate upon an input to command the drive mechanism to move the lifter arm such the plurality of movable louvers rotate to a desired position.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION

The present application discloses various embodiments of a grille shutter system and methods for using and constructing the same. For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
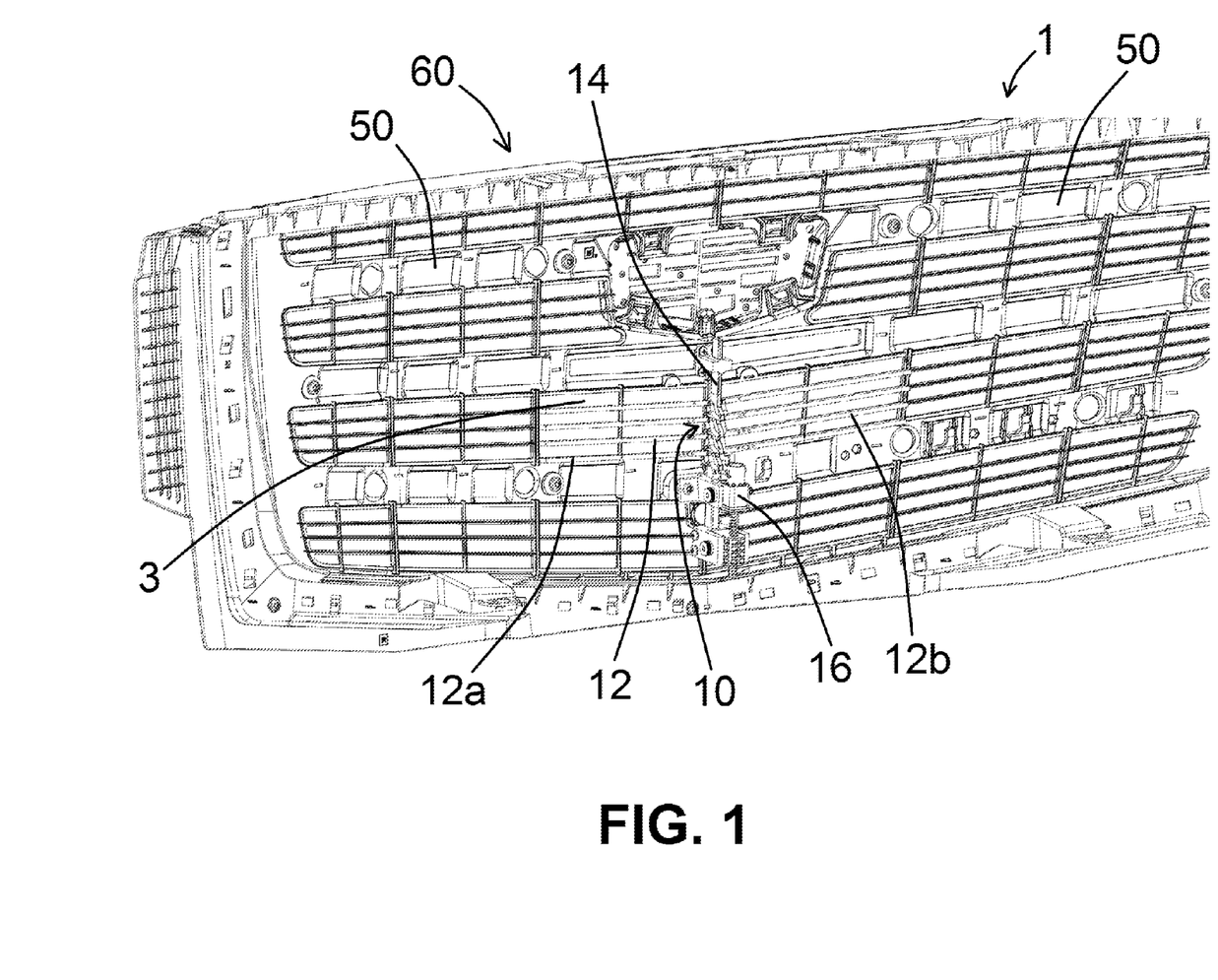
FIG. 1 shows an isometric view of an embodiment of a grille shutter system according to the present disclosure.

FIG. 1 shows a shutter system 10 according to at least one embodiment of the present disclosure. The shutter system 10 may be applied to reversibly cover any opening. The shutter system 10 may be employed for functional or largely aesthetic applications. As one example, the shutter system 10 may be integrated into a grille 1 of a vehicle (not shown) (also referred to herein as a vehicle grille 1) as part of an active grille shutter system 10 as described further herein. The grille 1 may be a front grille of the vehicle. Alternatively or additionally, the shutter system 10 may be integrated into any other ventilation opening on the vehicle, such as a side vent where the engine of the vehicle is located in the rear of the vehicle. The shutter system 10 may further be employed in other suitable applications, such as architectural or building heating and ventilation applications. As shown in FIG. 1, an exemplary overall system 60 of the present disclosure comprises a grille 1 and a shutter system 10 coupled thereto.

As shown in FIG. 1, the shutter system 10 may include a plurality of louvers 12, which may be arranged as a first set of louvers 12a and a second set of louvers 12b, in contact with at least one lifter 14. In certain embodiments, the shutter system 10 may include any desired number of sets of louvers 12 and corresponding lifters 14. The louvers 12 may be spaced apart from one another in an open position by a pre-determined distance such that the louvers 12 at least partially overlap one another when in a closed position. In certain embodiments, the louvers 12 may be spaced such that they do not overlap one another in the closed position but do substantially impede a flow through the shutter system 10. As shown in FIG. 1, grille 1 defined a plurality of apertures 3 therethrough, and the plurality of louvers 12 are present at (at least some of) the plurality of apertures 3.

The shutter system 10 may be connected to various members 50 of the grille 1. The members 50 may be lateral, transverse or vertical features of the grille 1. The members 50 may be structural and/or aesthetic features of the grille 1 integral with or attached to the grille 1. In certain embodiments, the shutter system 10 may comprise integral structural and/or aesthetic features of the grille 1.

The shutter system 10 may further include a drive mechanism 16, such as shown in FIG. 1, connected to the at least one lifter 14 and configured to move the lifter 14 on demand. The drive mechanism 16 is configured to drive the at least one lifter 14 to reversibly open and close the louvers 12. In embodiments having more than one lifter 14, the shutter system 10 may include one drive mechanism 16 for each lifter 14. Alternatively, the shutter system 10 may include less than one drive mechanism 16 per lifter 14. In such an embodiment, more than one lifter 14 may be moved or driven by a single drive mechanism 16.

Figure 2A:
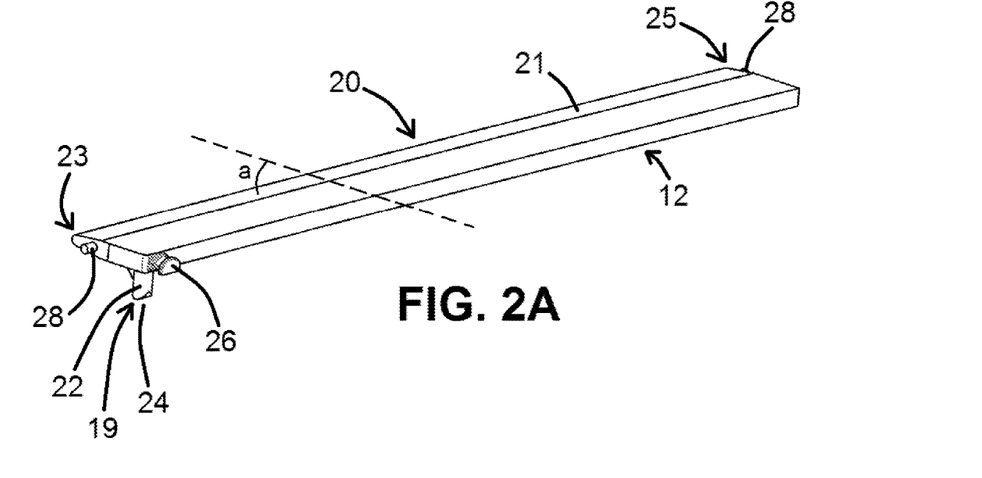
FIGS. 2A, 2B, and 2C show detailed isometric views of embodiments of a louver of a grille shutter system according to the present disclosure.
Figure 2B:
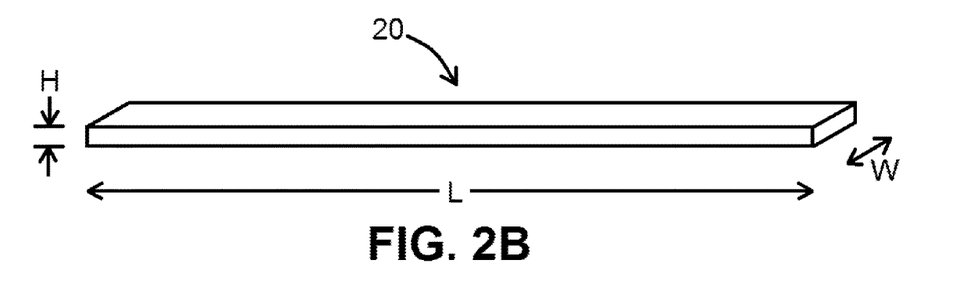
Figure 2C:
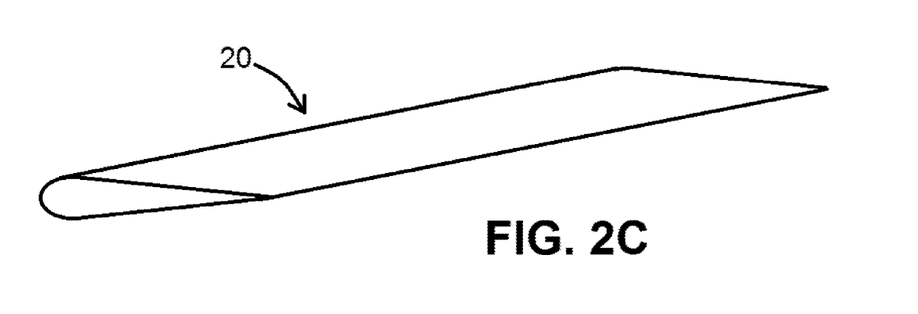

As illustrated in FIG. 2A, each louver 12 may include/comprise a slat 20. The slat 20 may comprise a body portion 21 having a principal longitudinal dimension or length (L) extending between two ends (a first end 23 and a second end 25) and a relatively shorter width (W) in comparison to its length (L), as shown in FIG. 2B. The slat 20 may further have a height (H) that is relatively thin compared to either its width (W) or length (L). Nonetheless, the slat 20 may embody any desired form and dimensions. For instance, and as shown in FIG. 2C, the slat 20 may have a generally airfoil shape in cross-section. Further, the plurality of louvers 12 need not be identically shaped.

Though the slat 20 depicted in FIG. 2A is generally straight from one end 23 to the other end 25, the slat 20 may include a developed, curvilinear shape with respect to its length, width or height. Depending on the application in which the shutter system 10 is employed, the slat 20 may have a length that arcs or forms one or more angles between the two ends. In certain embodiments, the slat 20 may have any desired shape that enables the first or second set of louvers 12a, 12b to substantially impede or restrict a flow therethrough. As shown in FIG. 2A, for example, an angle (a) may exist along slat 20, whereby the dashed line represents the plane defined by a horizontal portion 27 of slat 20, and whereby the angle (a) is the angle defined by said dashed line (corresponding to horizontal portion 27) and an angled portion 29 of slat 20, and whereby angle (a) is greater than zero. In applications where the slat 20 of the louver 12 is employed in the grille 1 of the vehicle, the slat 20 may be shaped to follow the desired styling lines of the vehicle with respect to the length, height or width of the slat 20.

The louver 12 may include a pin 28 at one or both ends of the slat 20 as shown in FIG. 2A. The louver 12 may further include a post 22 having an axis extending from the slat 20. The post 22 may be disposed at or near one end or both of the slat 20, offset from the pin 28 by a distance. In certain embodiments, the post 22 may be located at any suitable location along the length, width or height of the slat 20. In at least one embodiment, the post 22 may be located along the slat 20 such that the post 22 is adjacent the lifter 14 in assembly. The post 22 may have any suitable cross-sectional shape, including without limitation circular, rectilinear or ovoid.

The post 22 includes a distal face 24 opposite the slat 20, the distal face 24 present at the distal end 19 of each post 22. The distal face 24 may include a radius such that the distal face 24 is not wholly perpendicular to the axis of the post 22. In certain embodiments, the distal face 24 may not be solely defined by a single radius and may have a developed shape including various radii or compound angles relative to the axis of the post 22.

The louver 12 may further include a catch 26 extending from the slat 20. As shown in FIG. 2A, the catch 26 may extend from a face of the slat 20 defining the height of the slat 20, adjacent the post 22. Alternatively, the catch 26 may extend from another face of the slat 20 and may not be immediately adjacent the post 22. The catch 26 may be configured to retain a tensioner (not shown) as described further herein.

Figure 3:
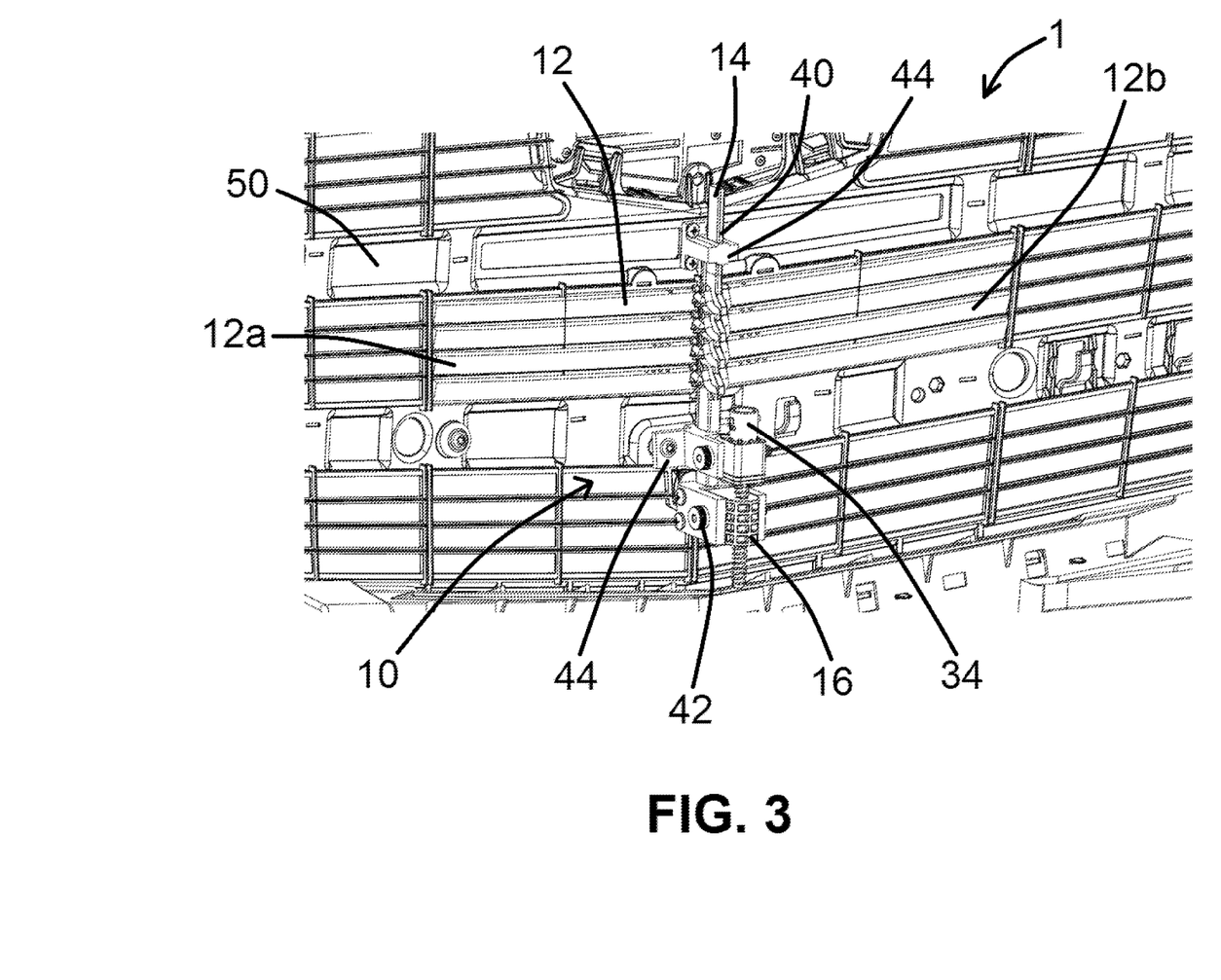
FIG. 3 shows a detailed isometric view of an embodiment of a grille shutter system in the closed position according to the present disclosure.

FIG. 3 illustrates a portion of the shutter system 10 in the closed position. In the closed position, each louver 12 of the first louver set 12a or second louver set 12b may be oriented such that its width is generally or substantially perpendicular to the flow, whether vertical, horizontal, or a direction in between. Consequently, in the closed position the louvers 12 are oriented so as to substantially close pre-defined gaps therebetween of the open position. In the closed position, the louvers 12 substantially or at least partially restrict or impede the flow of fluid, such as air, through the shutter system 10.

In embodiments where the first set of louvers 12a and the second set of louvers 12b are connected to the same lifter 14, both the first set of louvers 12a and second set of louvers 12b may be moved to the closed position simultaneously by movement of the lifter 14. The lifter 14 may include an arm 40 attached to a base 42, where the arm 40 is retained by one or more guides 44 attached to one or more members 50 of the grille 1, such as shown in FIG. 3. The guides 44 enable the arm 40 to move in a selected direction while preventing movement in other directions. Movement of the lifter 14 may be enabled by the drive mechanism 16. The drive mechanism 16 may be attached to the base 42 to communicate motion of the drive mechanism 16 to move the arm 40 via the base 42. In certain embodiments, the drive mechanism 16 may be attached directly to the arm 40. In the embodiment illustrated in FIG. 3, the lifter 14 may be translated up and down by the drive mechanism 16, and the guides 44 secure and stabilize the arm 40 while facilitating its up/down translation. Though the descriptions herein of the embodiments of the shutter system 10 refer to up/down motion of the lifters 14, one skilled in the art having the benefit of the present disclosure will appreciate that the shutter system 10 may be configured such that the lifters 14 motion is horizontal, or on an angle between vertical and horizontal, without affecting the disclosed operation of the shutter system 10. All such embodiments are anticipated.

In certain embodiments, a stationary portion of the drive mechanism 16 may be attached to one or more guides 44, and a moveable portion of the drive mechanism 16 may be attached to the base 42 as shown in FIG. 3 or directly to the arm 40. In certain embodiments, the stationary portion of the drive mechanism 16 may be attached to one or more members 50. Alternatively, the drive mechanism 16 may be attached to the lifter 14 by any suitable means that enables the desired, controlled translation of the lifter 14.

The drive mechanism 16 may include a worm gear as shown in FIG. 3. In such an embodiment, the mechanism 16 may include a drive input 34. The drive input 34 may be a cable-driven input, where a cable (not shown) attached to the drive input 34 is driven by a driver (not shown), such as a stepper or servo motor. In such an embodiment, one motor may be connected to more than one drive input 34 by one or more cables, thereby driving more than one drive mechanism 16. In certain embodiments, the drive mechanism 16 may include a rack and pinion structure. In alternative embodiments, the drive mechanism 16 may include a motor with a shaft connected to the base 42 or arm 40 and configured to move the lifter 14 directly.

Figure 4:
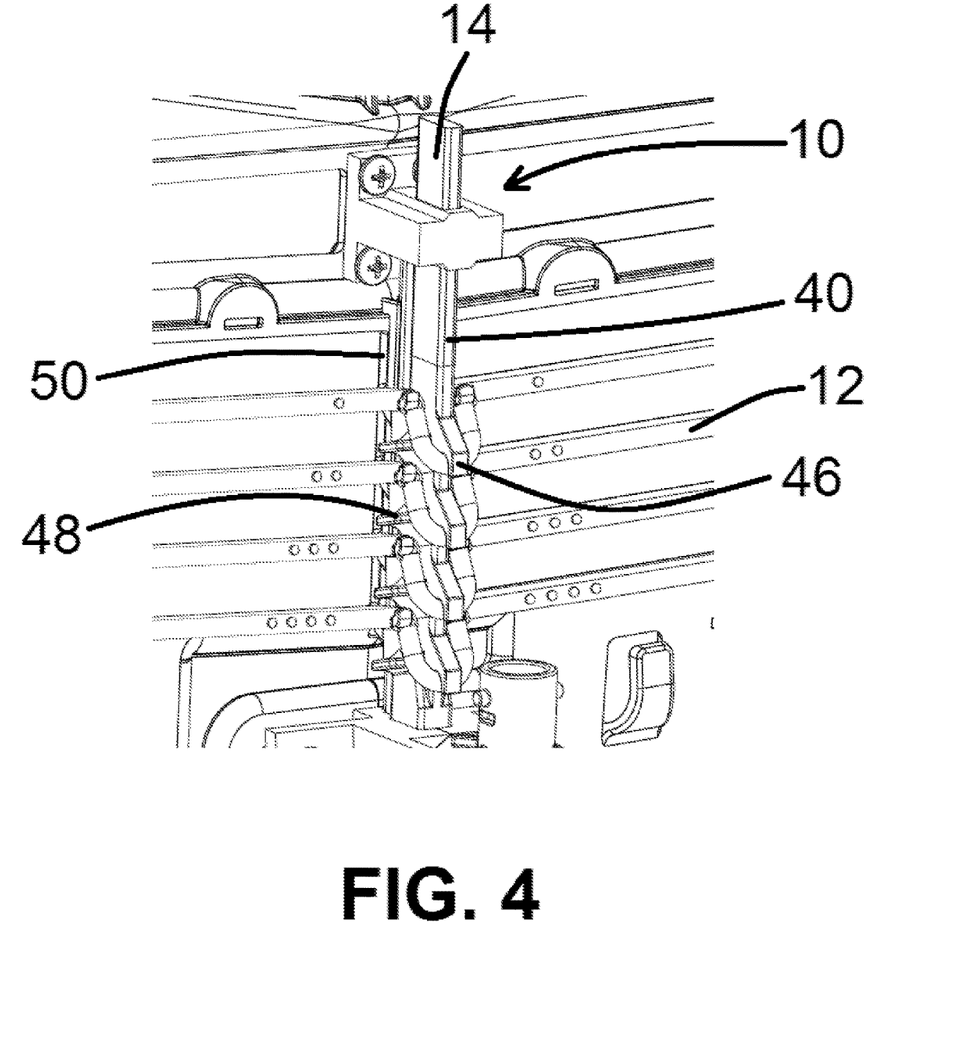
FIG. 4 shows a detailed isometric view of an embodiment of a grille shutter system in the open position according to the present disclosure.
Figure 5:
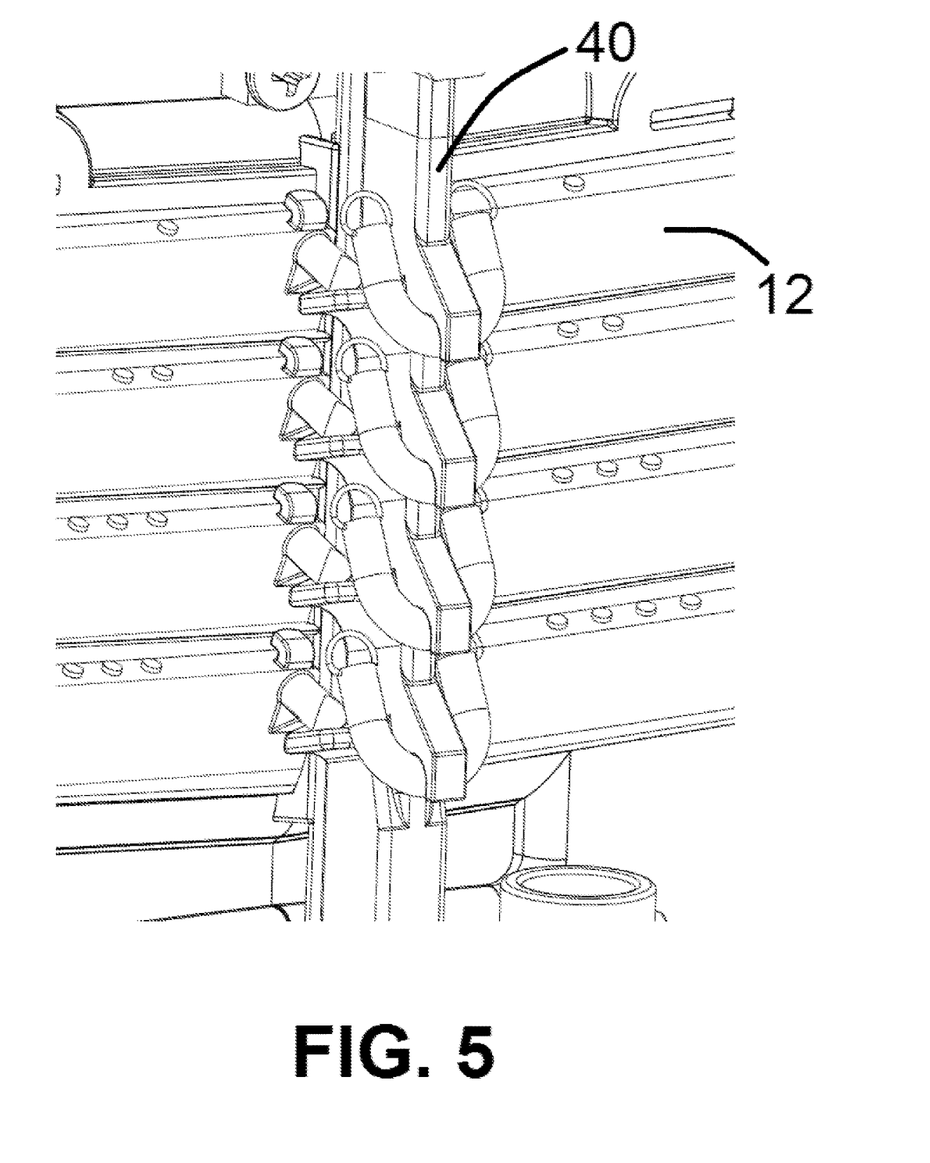
FIG. 5 shows a detailed isometric view of an embodiment of a grille shutter system in the closed position according to the present disclosure.

FIG. 4 illustrates a detail view of the interface between the louvers 12 and the arm 40 of the lifter 14. The lifter 14 may include a plurality of spurs 46 extending from the arm 40. The lifter 14 may further include a plurality of platforms 48 extending from the arm 42. As shown in FIG. 4, the distal face 24 of the post 22 of each louver 12 may rest upon the platform 48. The pin 28 of the louver 12 may be disposed within a recess (not shown) in the adjacent member 50 such that the louver 12 rotates about the pin 28 when a force is applied to the distal face 24 due to the offset distance between them. In operation, when the arm 40 is moved upward by the drive mechanism 16, each platform 48 applies force to each post 22 at its distal face 24, causing the louver 12 to rotate about the pin 28. As the louver 12 to rotates about the pin 28, the post 22 rocks on the platform 48 at the distal face 24. The arm 40 may be moved to the point that the louvers 12 rotate to the closed position as shown in FIG. 5.

Because the post 22 rests upon the platform 48 but is not fixedly fastened thereto and because the distal face 24 has a radiused or otherwise developed shape, the post 22 has at least one degree of freedom to rock in an irregular, non-circular, and/or non-linear manner upon the platform 48. In embodiments that include a second pin 28 opposite the end of the slat 20 adjacent lifter 14, the pins 28 need not be linearly disposed from one another. The second pin 28 may be disposed in a recess in a second member 50 opposite the lifter 14 or may be otherwise retained in manner enabling rotation of the louver 12. The louver 12 may not have a single, fixed axis of rotation. The lack of a fixed axis of rotation enables the louver 12 to open and close through any selected arc of rotation depending on the dimensions of the post 22, including the form of the distal face 24, and the position of the pin 28 relative thereto. Consequently, the louver 12 may have in a variety of shapes, including shapes having significant and varying curvature, and need not be straight, planar slats as in conventional shutter systems.

Figure 6:
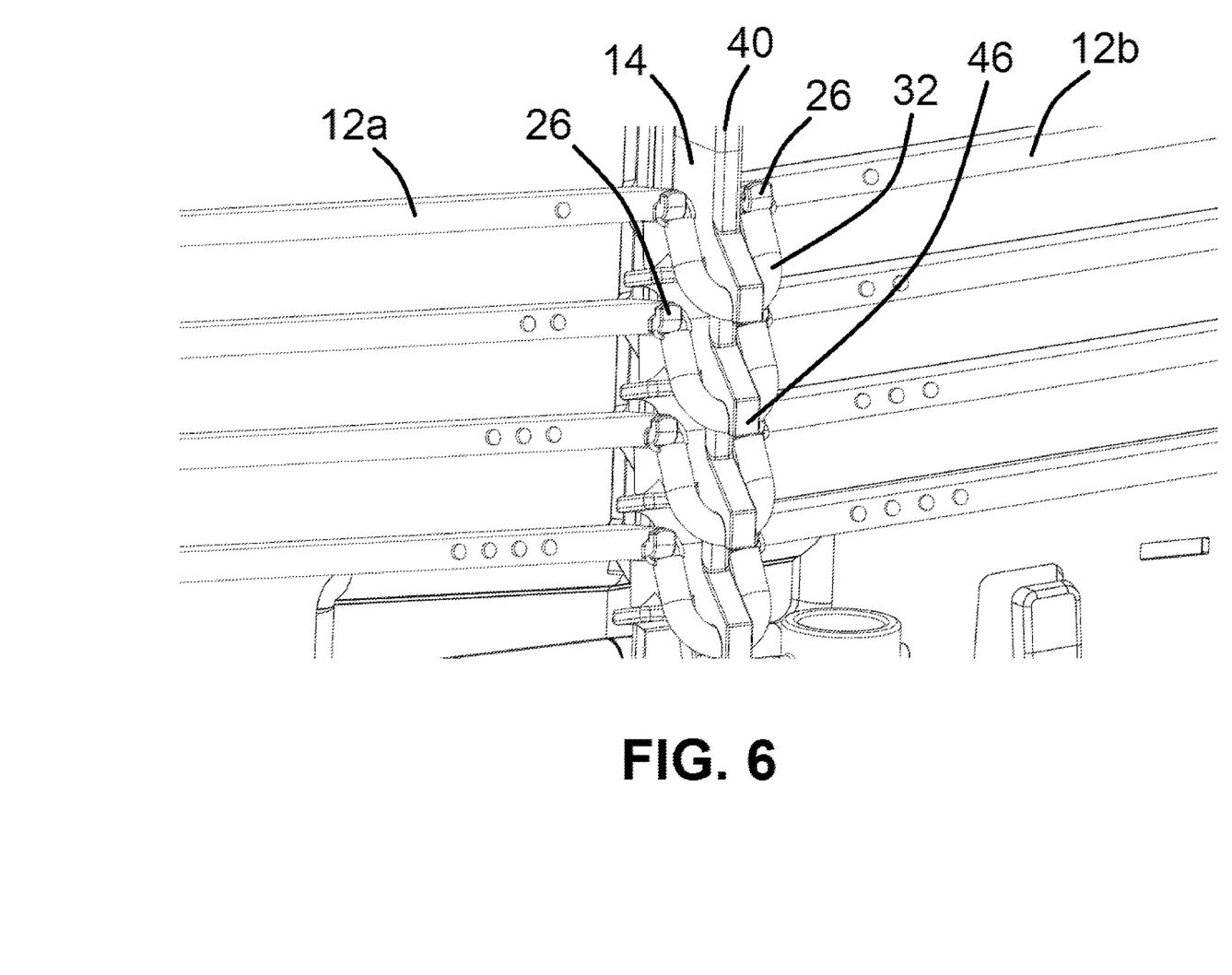
FIG. 6 shows a detailed isometric view of an embodiment of a grille shutter system in the open position according to the present disclosure.

The shutter system 10 may include a plurality of tensioners 32 as shown in FIG. 6. Each tensioner 32 may be attached to each catch 26 of the louvers 12. Each tensioner 32 may be structured to secure and stabilize its corresponding louver 12 relative to the lifter 14. The tensioner 32 may extend from the catch 26 to the spur 46 of the lifter 14, thereby providing tension therebetween. The tensioner 32 may facilitate maintaining contact between the distal face 24 of the post 22 and the platform 48 of the lifter 14 to prevent or mitigate undesired movement or rattling of the louver 12 relative to the lifter 14. In applications where the shutter system 10 is employed on a vehicle, the tensioner 32 may be structured to resist road and engine vibration, air resistance, and other forces that may act upon the louver 12 during operation of the vehicle. The tensioner 32 may be any suitable means of maintaining contact between the post 22 and the platform 48, including but not limited to a resilient member, such as a spring, band, belt or cable, or a hydraulic or gas tensioner.

As shown in FIG. 6, the tensioner 32 may extend from the catch 26 of an individual louver 12 of the first set of louvers 12a to an adjacent catch 26 of an individual louver 12 of the adjacent second set of louvers 12b, passing under, around or through the spur 46 therebetween. In such an embodiment, the spur 46 may be structured to retain the tensioner 32 through the full range of motion of the lifter 14 between the open to the closed positions. In certain embodiments, the tensioner 32 may connect to and stabilize one louver 12. In alternative embodiments, the tensioner 32 may connect to and stabilize more than one louver 12 as shown in FIG. 6. In at least one embodiment, the tensioner 32 may connect to and stabilize multiple louvers 12 of a given set of louvers such as the first set of louvers 12a or the second set of louvers 12b.

The shutter system 10 is capable of adjustably positioning the louvers 12 in any position between and including the open and closed positions. For example, under certain operating conditions where a limited degree of flow through the shutter system 10 is desired, the louvers 12 may be rotated by movement of the lifter 14 to any selected angle between the fully open and the fully closed positions. The shutter system 10 may include a controller (not shown) configured to control the movement and position of the lifter 14 via the drive mechanism 16. In certain embodiments, the controller may select the position of the louvers 12 and command the drive mechanism 16 to move the louvers 12 to the selected position via the lifter 14. The controller may operate upon such inputs as ambient temperature, engine temperature, coolant temperature, mass flow through the grille and vehicle speed, among other suitable inputs, to determine the desired degree of openness of the shutter system 10. Such an embodiment combining the shutter system 10 and the controller may be referred to as an active grille shutter system.

The controller may include one or more modules structured to functionally execute the operations of the controller. In certain embodiments, the controller forms a portion of a processing subsystem including one or more computing devices having memory, processing, and communication hardware. The controller may be a single device or a distributed device, and the functions of the controller may be performed by hardware or software. The controller may be configured to solely control the shutter system 10 or to control other aspects of the vehicle's systems as well.

When employed in the grille 1 of a vehicle, the shutter system 10 may be integrated with the grille 1 to reduce packaging space and reduce the weight of the combined grille 1 and shutter system 10 relative to conventional grille shutter systems. The shutter system 10 is scalable by combining multiple sets of louvers 12a, 12b, which may be driven by a common lifter 14. Further, the ability of the shutter system 10 to rotate about one or more non-linear axes enables the louvers 12 to have complex shapes, including shapes stylized for vehicle's exterior appearance, thereby integrating the appearance and functional aspects of the grille 1 in the shutter system 10.

While various embodiments of an active grille shutter system and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A shutter system, comprising:
  a plurality of moveable louvers each including a slat portion, a catch, and a post extending from the slat portion, each of the posts having a distal end defining a distal face;

a lifter including a lifter arm having a plurality of platforms and a plurality of spurs extending therefrom, wherein the distal ends of the posts are positioned upon the plurality of platforms;

a plurality of tensioners each connected to the catch of an adjacent louver of the plurality of movable louvers and further configured to apply tension between the adjacent louver and the spur of an adjacent lifter; and a drive mechanism connected to the lifter arm and structured to reversibly move the lifter arm and the plurality of platforms extending therefrom;

wherein movement of the lifter arm and platforms causes the plurality of movable louvers to rotate about a pin extending from each of the plurality of movable louvers, each of the pins adjacent to and offset from each of the posts.

2. The shutter system of claim 1, further comprising:
at least one lifter guide configured to maintain alignment of the lifter arm.

3. The shutter system of claim 1, further comprising:
a drive input connected to the drive mechanism.

4. The shutter system of claim 1, further comprising:
a controller structured to operate upon an input to command the drive mechanism to move the lifter arm such the plurality of movable louvers rotate to a desired position.

5. The shutter system of claim 1, wherein in the distal face has a radius.

6. The shutter system of claim 1, wherein in the distal face has a developed shape.

7. The shutter system of claim 1, wherein the plurality of movable louvers comprises louvers on each side of the lifter.

8. The shutter system of claim 1, wherein each louver of the plurality of movable louvers has a generally airfoil shape in cross-section.

9. The shutter system of claim 1, wherein each louver of the plurality of movable louvers includes a horizontal portion and an angled portion.

10. The shutter system of claim 1, wherein the shutter system is integral with a grille of a vehicle.

11. An overall system, comprising:
a shutter system comprising:
   a plurality of moveable louvers each including a slat portion, a catch, and a post extending from the slat portion, each of the posts having a distal end defining a distal face,
   a lifter including a lifter arm having a plurality of platforms and a plurality of spurs extending therefrom, wherein the distal ends of the posts are positioned upon the plurality of platforms,
   a plurality of tensioners each connected to the catch of an adjacent louver of the plurality of movable louvers and further configured to apply tension between the adjacent louver and the spur of an adjacent lifter, and
   a drive mechanism connected to the lifter arm and structured to reversibly move the lifter arm and the plurality of platforms extending therefrom,
   wherein movement of the lifter arm and platforms causes the plurality of movable louvers to rotate about a pin extending from each of the plurality of movable louvers, each of the pins adjacent to and offset from each of the posts; and a vehicle grille, wherein the shutter system is coupled to the vehicle grille and operable to open and close the plurality of movable louvers when coupled to the vehicle grille.

12. The overall system of claim 11, wherein the vehicle grille has a plurality of apertures defined therethrough, and wherein the plurality of movable louvers are located at the plurality of apertures.

13. The overall system of claim 11, wherein the shutter system further comprises at least one lifter guide configured to maintain alignment of the lifter arm.

14. The overall system of claim 11, wherein the shutter system further comprises a drive input connected to the drive mechanism.

15. The overall system of claim 11, wherein the shutter system further comprises a controller structured to operate upon an input to command the drive mechanism to move the lifter arm such the plurality of movable louvers rotate to a desired position.

16. The overall system of claim 11, wherein the plurality of movable louvers comprises louvers on each side of the lifter.

17. The overall system of claim 11, wherein each louver of the plurality of movable louvers has a generally airfoil shape in cross-section.

18. The overall system of claim 11, wherein each louver of the plurality of movable louvers includes a horizontal portion and an angled portion.

19. A shutter system, comprising:
a plurality of moveable louvers each including a slat portion, a catch, and a post extending from the slat portion, each of the posts having a distal end defining a distal face;

a lifter including a lifter arm having a plurality of platforms and a plurality of spurs extending therefrom, wherein the distal ends of the posts are positioned upon the plurality of platforms;

a plurality of tensioners each connected to the catch of an adjacent louver of the plurality of movable louvers and further configured to apply tension between the adjacent louver and the spur of an adjacent lifter; and a drive mechanism connected to the lifter arm and structured to reversibly move the lifter arm and the plurality of platforms extending therefrom;

wherein movement of the lifter arm and platforms causes the plurality of movable louvers to rotate about a pin extending from each of the plurality of movable louvers, each of the pins adjacent to and offset from each of the posts;

wherein the plurality of movable louvers comprises louvers on each side of the lifter; and wherein the shutter system is configured to be coupled to a vehicle grille such that the plurality of movable louvers are present at apertures defined within the vehicle grille and wherein the shutter system is operable to open and close the plurality of movable louvers when coupled to the vehicle grille.

20. The shutter system of claim 19, further comprising:
a controller structured to operate upon an input to command the drive mechanism to move the lifter arm such the plurality of movable louvers rotate to a desired position.

* * * * *